(12) United States Patent
Crucs

(10) Patent No.: US 9,851,376 B2
(45) Date of Patent: Dec. 26, 2017

(54) APPARATUS AND METHOD TO AID IN FINDING MISPLACED, FORGOTTEN, OR UNUSED ITEMS

(71) Applicant: Crucs Holdings, LLC, Copley, OH (US)

(72) Inventor: Kevin M. Crucs, Copley, OH (US)

(73) Assignee: Crucs Holdings, LLC, Copley, OH (US)

( * ) Notice: Subject to any disclaimer, the term of this patent is extended or adjusted under 35 U.S.C. 154(b) by 0 days.

(21) Appl. No.: 14/943,442

(22) Filed: Nov. 17, 2015

(65) Prior Publication Data

US 2016/0069925 A1 Mar. 10, 2016

Related U.S. Application Data

(63) Continuation of application No. 13/332,492, filed on Dec. 21, 2011, now Pat. No. 9,217,754.

(51) Int. Cl.
| | |
|---|---|
| G05B 23/02 | (2006.01) |
| G01P 15/00 | (2006.01) |
| G01P 13/00 | (2006.01) |
| G08B 21/02 | (2006.01) |
| G08B 21/04 | (2006.01) |
| G08B 21/22 | (2006.01) |

(52) U.S. Cl.
CPC ............ *G01P 15/00* (2013.01); *G01P 13/00* (2013.01); *G08B 21/0263* (2013.01); *G08B 21/0269* (2013.01); *G08B 21/0272* (2013.01); *G08B 21/0423* (2013.01); *G08B 21/22* (2013.01)

(58) Field of Classification Search
CPC ............ G08B 21/0208; G08B 21/0202; G08B 25/016; G08B 21/02; G08B 21/0227; G08B 21/0269; G08B 13/1427; G08B 21/0294; G08B 21/0211; G08B 21/0288; G08B 21/0291; G08B 21/22; G08B 21/023; G08B 21/0263; G08B 21/0423; G08B 21/0272; G01P 15/00; G01P 13/00
See application file for complete search history.

(56) References Cited

U.S. PATENT DOCUMENTS

| | | | |
|---|---|---|---|
| 6,356,836 B1 * | 3/2002 | Adolph | G01C 21/26 701/410 |
| 6,940,407 B2 | 9/2005 | Miranda-Knapp et al. | |
| 6,967,576 B2 | 11/2005 | Hayes et al. | |
| 7,196,621 B2 * | 3/2007 | Kochis | G06Q 10/08 340/539.13 |
| 7,205,890 B2 | 4/2007 | Defant et al. | |

(Continued)

FOREIGN PATENT DOCUMENTS

JP 11009559 1/1999

*Primary Examiner* — Joseph Feild
*Assistant Examiner* — Rufus Point
(74) *Attorney, Agent, or Firm* — Hahn Loeser & Parks, LLP

(57) ABSTRACT

Devices to aid in finding items, including purses or other luggage, along with methods of operation of the devices. The resultant movement of an item during use, and lack of movement of an item during non-use, are exploited to alert a user to the whereabouts of the item through adaptive techniques. A device is located with the item, purse, or other luggage, and configured to sense motion information. Location notification may be based on such motion information.

23 Claims, 10 Drawing Sheets

(56) References Cited

U.S. PATENT DOCUMENTS

| | | | |
|---|---|---|---|
| 7,474,208 B1* | 1/2009 | Klein | G08B 21/24 340/384.4 |
| 7,714,711 B1* | 5/2010 | Daniel | A43B 3/00 340/539.1 |
| 7,719,418 B2* | 5/2010 | Grossman | G01S 11/06 340/539.15 |
| 8,095,150 B2 | 1/2012 | Dunko | |
| 8,144,015 B2* | 3/2012 | Burket | G08B 13/1427 340/10.1 |
| 8,253,559 B2* | 8/2012 | Howard | G08B 13/1427 340/539.1 |
| 8,253,560 B2* | 8/2012 | Howard | G08B 21/0247 340/539.1 |
| 2001/0048364 A1* | 12/2001 | Kalthoff | G01S 5/0009 340/573.1 |
| 2003/0030568 A1* | 2/2003 | Lastinger | G06K 7/0008 340/8.1 |
| 2004/0034470 A1* | 2/2004 | Workman | G08B 13/1436 701/490 |
| 2005/0064913 A1* | 3/2005 | Kim | H04M 19/041 455/567 |
| 2005/0192741 A1* | 9/2005 | Nichols | G01C 21/20 701/1 |
| 2005/0246098 A1* | 11/2005 | Bergstrom | G01S 5/0018 340/539.13 |
| 2006/0023679 A1* | 2/2006 | Twitchell | H04Q 9/00 370/338 |
| 2006/0238347 A1* | 10/2006 | Parkinson | G08B 13/1436 340/572.4 |
| 2007/0124062 A1* | 5/2007 | Janky | G08B 25/10 701/468 |
| 2007/0262862 A1* | 11/2007 | Barrett | G08B 13/1427 340/539.15 |
| 2008/0074265 A1* | 3/2008 | Schoen | G08B 13/1427 340/572.1 |
| 2008/0136642 A1* | 6/2008 | Wise | G08B 13/1427 340/572.1 |
| 2008/0231447 A1* | 9/2008 | Grossman | G01S 11/06 340/572.1 |
| 2008/0272928 A1* | 11/2008 | Shuster | F21L 4/027 340/815.75 |
| 2009/0195350 A1* | 8/2009 | Tsern | G06F 1/1626 340/3.1 |
| 2009/0315704 A1* | 12/2009 | Rosing | G06Q 10/08 340/539.13 |
| 2010/0033329 A1* | 2/2010 | Davis | G08B 13/1436 340/571 |
| 2010/0300163 A1* | 12/2010 | Loughlin | E05B 37/08 70/301 |
| 2011/0133933 A1* | 6/2011 | Davis | G08B 13/1427 340/571 |
| 2012/0242481 A1* | 9/2012 | Gernandt | G06K 19/0705 340/539.13 |
| 2015/0119069 A1* | 4/2015 | Harris | H04W 64/00 455/456.1 |

\* cited by examiner

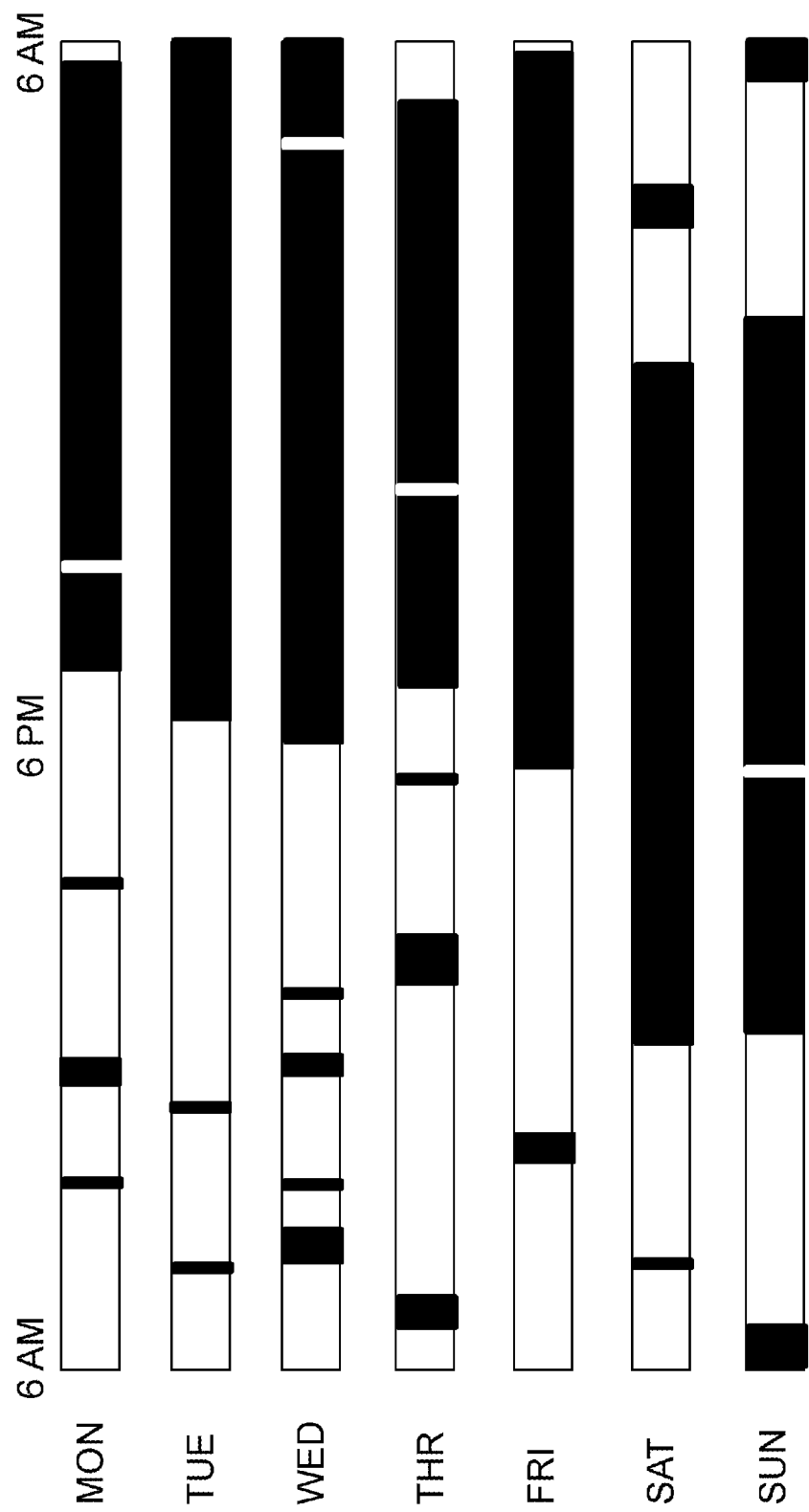

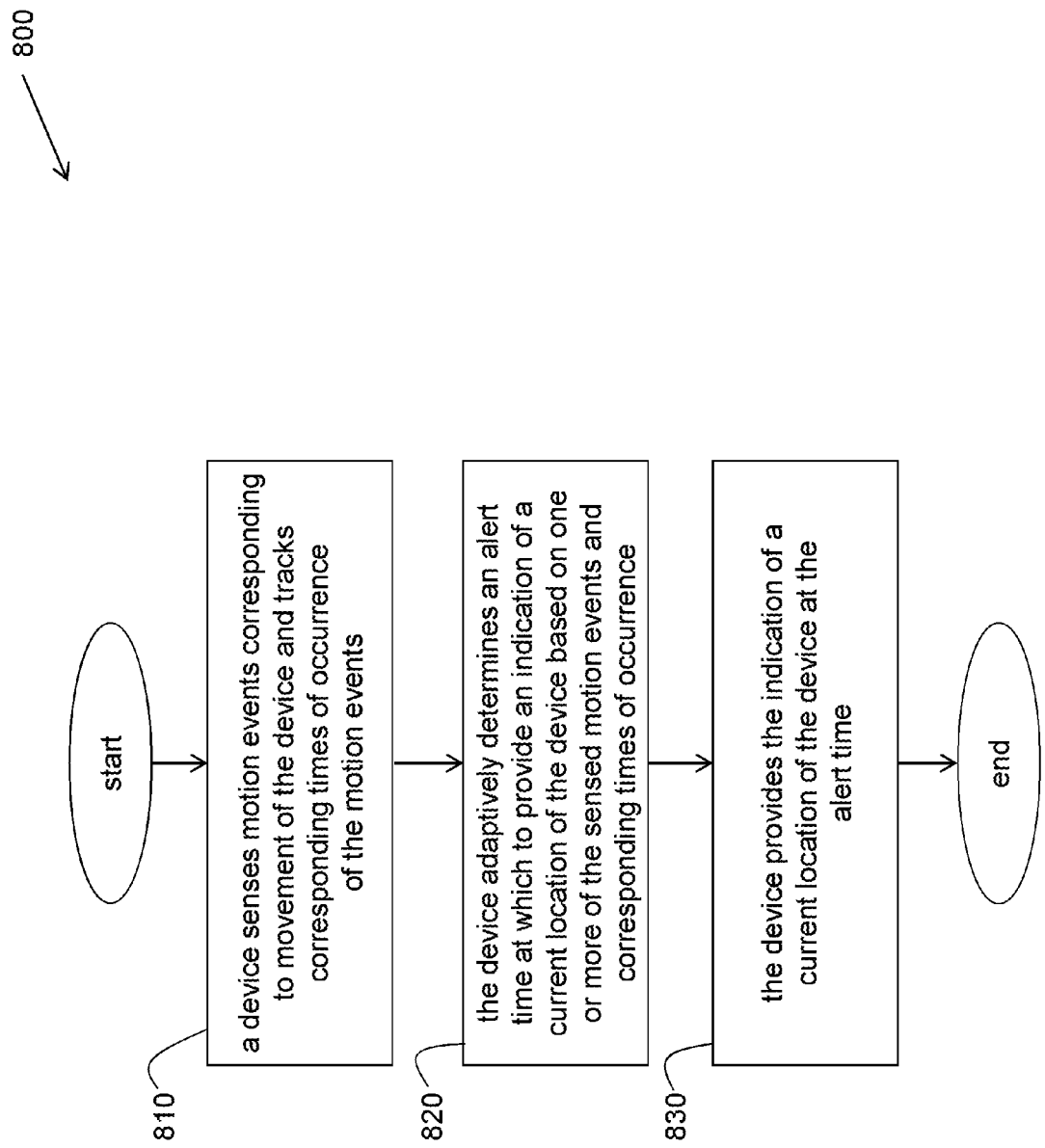

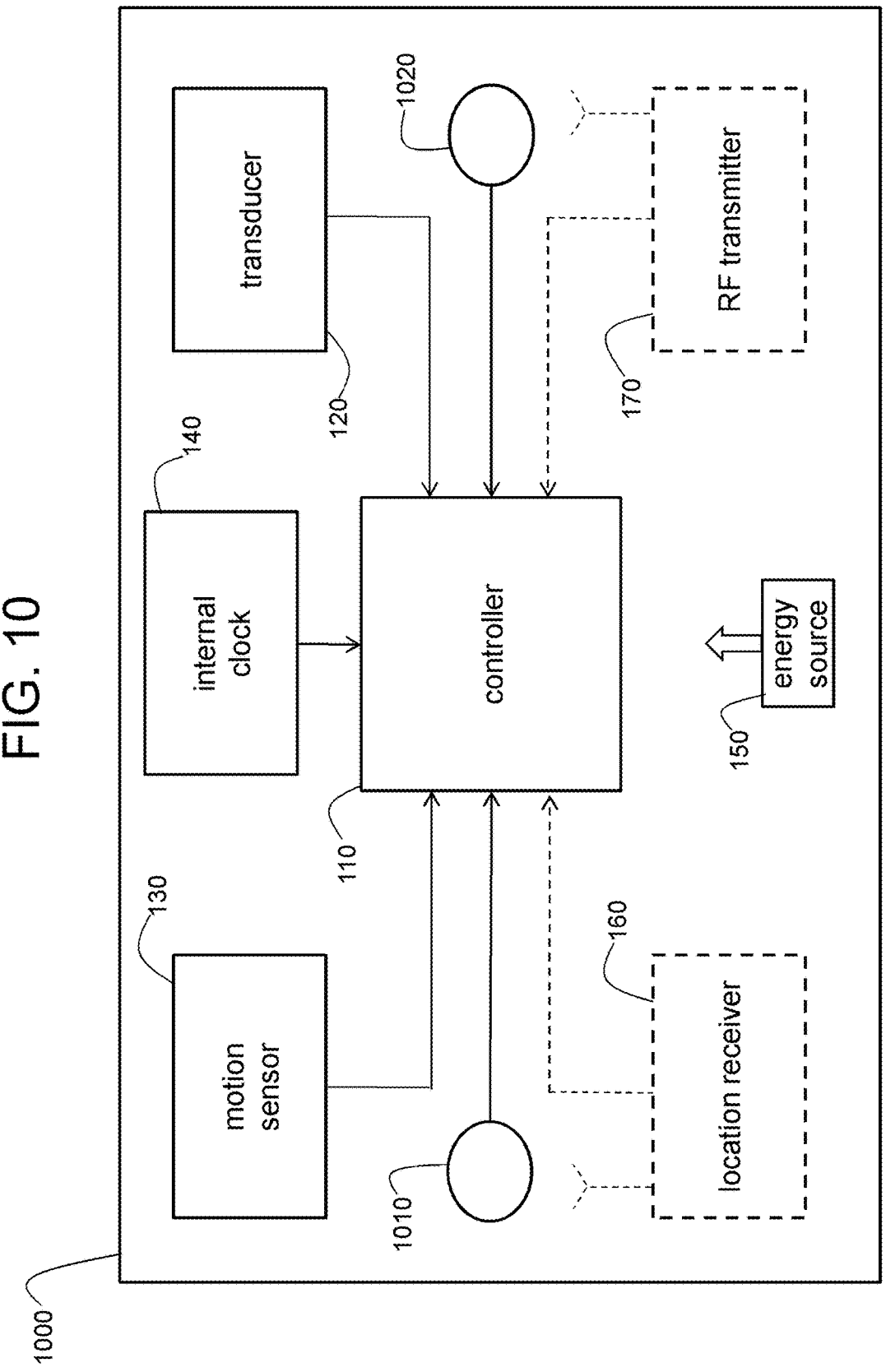

APPARATUS AND METHOD TO AID IN FINDING MISPLACED, FORGOTTEN, OR UNUSED ITEMS

CROSS-REFERENCE TO RELATED APPLICATION

This application is a continuation of U.S. patent application Ser. No. 13/332,492 filed on Dec. 21, 2011.

TECHNICAL FIELD

Certain embodiments of the present invention relate to devices and methods for finding a misplaced, forgotten, or unused item. More particularly, certain embodiments relate to devices and methods for finding a misplaced, forgotten, or unused item by applying adaptive responses to sensed motion over time.

BACKGROUND

People often misplace items such as keys, purses, wallets, eye glasses, cell phones, as well as other items. For example, people with Alzheimer's disease or other short term memory problems may be more susceptible to forgetting where they placed an item. Keys, a wallet, or a cell phone can easily fall out of a person's pocket while sitting on furniture (e.g., a couch) at home and get lost in the joints of the upholstery without the person realizing it. It is desirable to provide a way for a person to more easily find an item that has been misplaced, forgotten, or unused for a period of time.

Further limitations and disadvantages of conventional, traditional, and proposed approaches will become apparent to one of skill in the art, through comparison of such approaches with the subject matter of the present application as set forth in the remainder of the present application with reference to the drawings.

SUMMARY

An embodiment of the present innovations comprises a device to aid in finding an associated item. The device includes a controller, a transmitter operatively coupled with the controller and configured to communicate with a device of a user, a location receiver located with the associated item and operatively coupled with the controller configured to identify a location of the device, and a motion sensor located with the associated item and operatively coupled with the controller configured to detect motion information. In embodiments, the transmitter provides a notification including the location based on the motion information.

Another embodiment of the present innovations includes a system comprising a purse, a location receiver located with the purse and configured to identify a location of the purse, a motion sensor located with the purse and configured to detect motion information of at least the purse, a controller, and a transmitter operatively coupled with the controller and configured to communicate with at least the location receiver. In embodiments the transmitter provides a notification including the location based on the motion information.

A further embodiment of the present innovations includes a system, comprising a luggage item, a location receiver located with the luggage item and configured to identify a location of the luggage item, a motion sensor located with the luggage item and configured to detect motion information of at least the luggage item, a controller, and a transmitter operatively coupled with the controller and configured to communicate with at least the location receiver. In embodiments, the transmitter provides a notification including the location based on the motion information.

These and other novel features of the subject matter of the present application, as well as details of illustrated embodiments thereof, will be more fully understood from the following description and drawings.

BRIEF DESCRIPTION OF THE DRAWINGS

FIG. 5 is an illustration of an example timeline covering the course of one week and showing time intervals of motion activity and motion inactivity of an item of a user during that week;

FIG. 8 is a flowchart of a second embodiment of a method of operation of the device of FIG. 1 and FIG. 2;

FIG. 10 illustrates a schematic block diagram of an alternative embodiment of a device to aid in finding an associated item.

DETAILED DESCRIPTION

Figure 1:
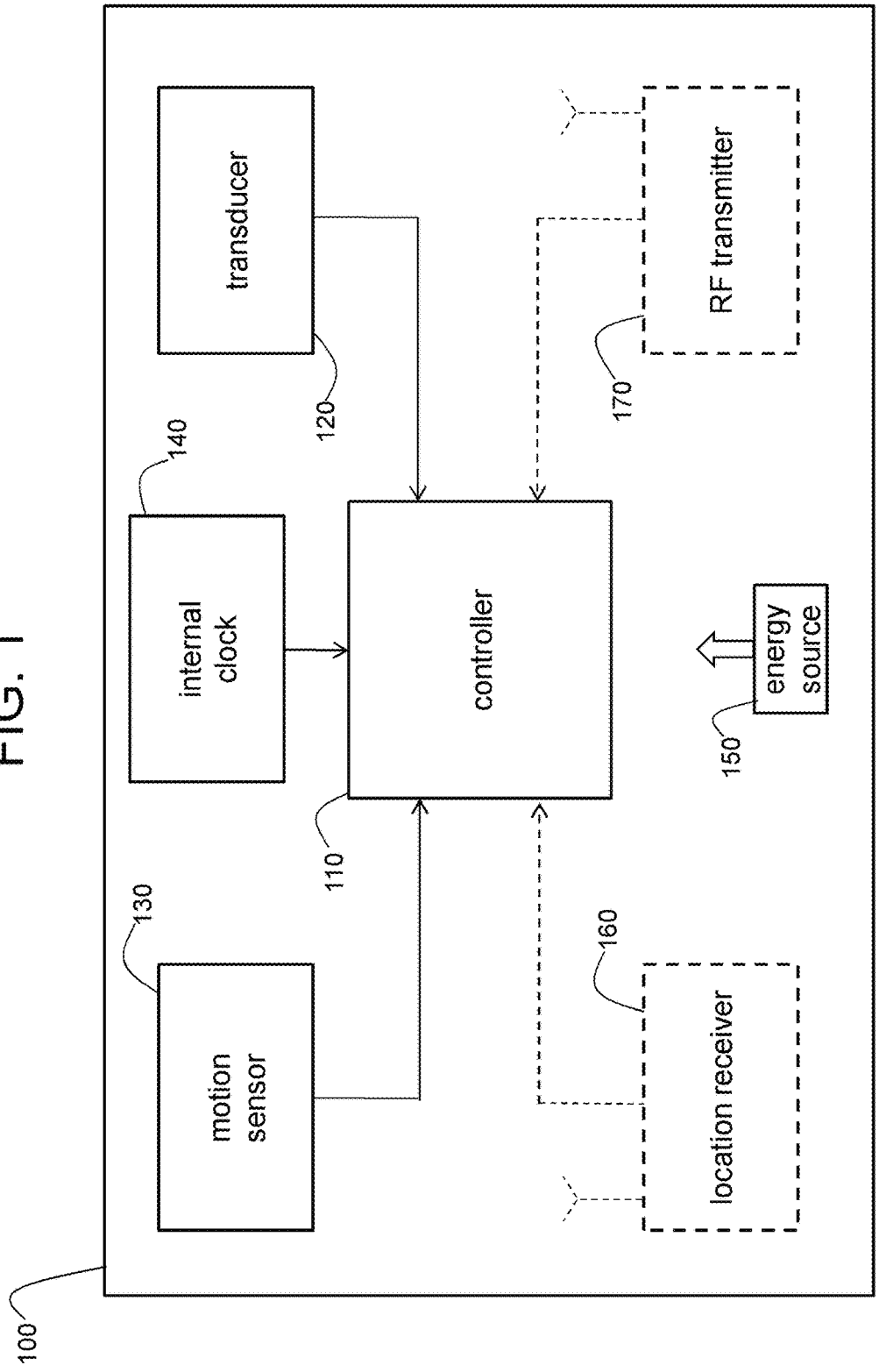
FIG. 1 illustrates a schematic block diagram of an embodiment of a device to aid in finding an associated item.

FIG. 1 illustrates a schematic block diagram of an embodiment of a device 100 to aid in finding an associated item. The item may be, for example, a set of keys, a purse, a wallet, or eye glasses. The device 100 may be attached to the item or may be an integral part of the item, in accordance with various embodiments.

The device 100 includes a controller 110. The controller 110 may have, for example, a software programmable processor, or may be a hardware logic controller. The device 100 also includes one or more transducers 120 operatively connected to the controller 110. The transducer 120 may be, for example, an audible transducer or a visible light-emitting transducer. Use of the transducer 120 is explained in more detail later herein. The device 100 further includes a motion sensor 130 operatively connected to the controller 110 to provide motion information corresponding to movement of the device 100 to the controller 110. The motion sensor 130 may have, for example, an accelerometer.

The device 100 also includes a clock 140 operatively connected to the controller 110 to provide timing information to the controller. The clock 140 may have, for example, a crystal oscillator providing accurate operation. The device 100 further includes an energy source 150 such as, for example, a DC battery. The energy source 150 provides electrical energy to one or more of the controller 110, the transducer 120, the motion sensor 130, and the clock 140, in accordance with various embodiments.

In accordance with an embodiment, the controller 110 is configured to identify time intervals of motion activity and/or motion inactivity of the device 100 based on the motion information provided by the motion sensor 130 and the timing information provided by the clock 140. The controller 110 is also configured to adaptively operate the transducer 120 based on one or more of the identified time intervals. Exemplary details of such adaptive operation are provided later herein.

As an option, the device 100 may include a location receiver 160 operatively connected to the controller 110 and configured to determine a location of the device 100 and provide associated first location information to the controller 110. In accordance with an embodiment, the location receiver 160 is a global positioning system (GPS) receiver and the first location information is GPS coordinate information. The energy source 150 can also provide electrical energy to the location receiver 160.

Also, as an option, the device 100 may include a radio frequency (RF) transmitter 170 operatively connected to the controller 110. The RF transmitter 170 is configured to receive second location information from the controller 110. The second location information is derived by the controller 110 from the first location information. For example, the controller 110 may be configured to assign or map names of rooms in a user's house (second location information) to the GPS coordinate information (first location information). The energy source 150 can also provide electrical energy to the RF transmitter 170.

The RF transmitter 170 is further configured to transmit the second location information as a message in an RF signal. In accordance with various embodiments, the message may be a text message or an email message, and the RF signal may be compatible with a mobile telephone network or a Wi-Fi network, for example. Other types of messages and communication networks are possible as well, in accordance with other embodiments. Use of the location receiver 160 and the RF transmitter 170 is explained in more detail later herein.

Figure 2:
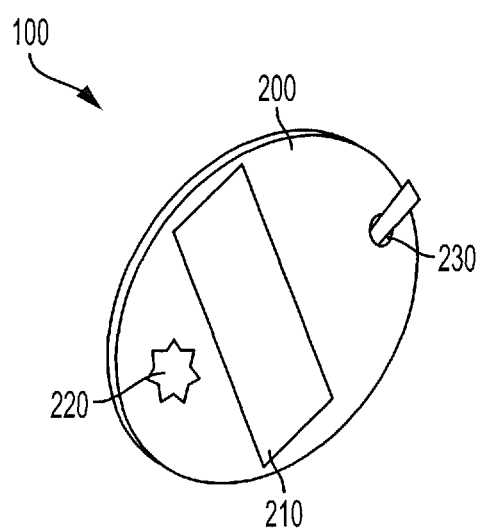
FIG. 2 is an illustration of an embodiment of the device of FIG. 1.
Figure 3A:
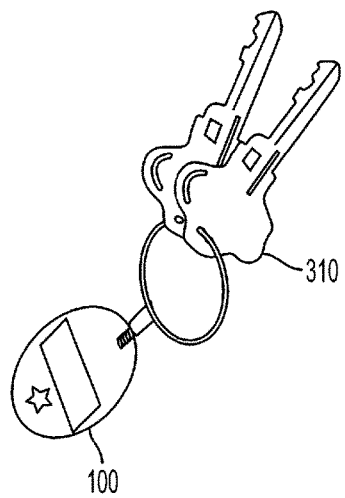
FIGS. 3A-3D are illustrations of embodiments of the device of FIG. 2 in use when associated with various items such as keys, a purse, a wallet, and eye glasses.
Figure 3B:
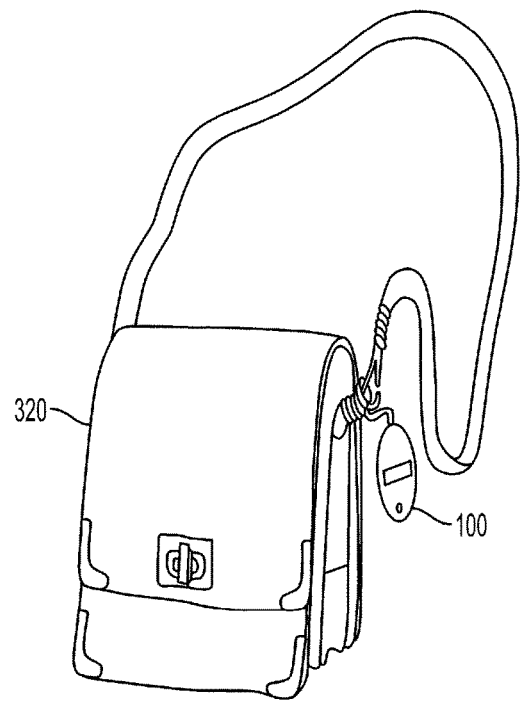
Figure 3C:
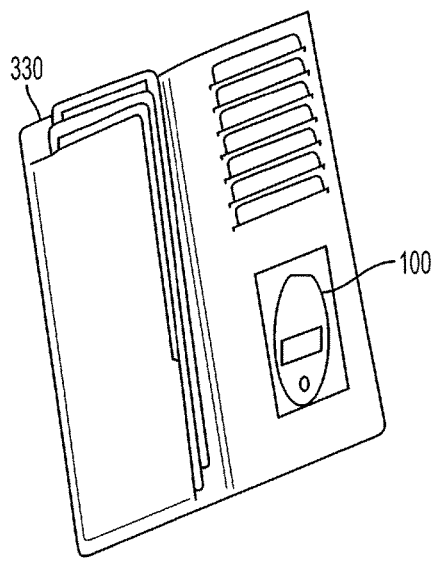
Figure 3D:
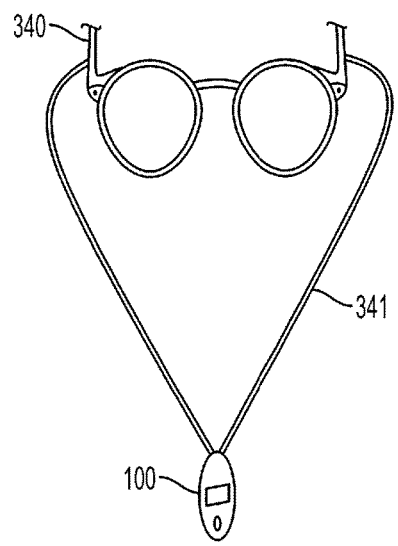

FIG. 2 is an illustration of an embodiment of the device 100 of FIG. 1. The elements of the device 100 are enclosed in a housing 200 of the device 100. For example, the elements of FIG. 1 may be mounted on a circuit board and encased in the housing 200. The housing 200 may be a molded plastic housing, for example. A face of the housing 200 provides a first port 210 (e.g., a plurality of small holes) through which audible sound produced by an audible transducer 120 may pass. The face of the housing 200 also provides a second port 220 (e.g., a transparent window) through which visible light produced by a visible transducer 120 may pass. The housing 200 may also have an aperture 230 configured to allow a chain or a lanyard, for example, to pass through. The chain or lanyard may be used to attach the device 100 to an item as illustrated in FIGS. 3A-3D.

FIGS. 3A-3D are illustrations of embodiments of the device 100 of FIG. 2 in use when associated with various items such as keys 310, a purse 320, a wallet 330, and eye glasses 340. As shown in FIGS. 3A-3D, the device 100 may attach to the associated item in various ways, depending on the nature of the item. For example, the device 100 attaches to the eyeglasses 340 via a lanyard 341, whereas the device 100 attaches to the inside of the wallet 330 via an adhesive.

Figure 4:
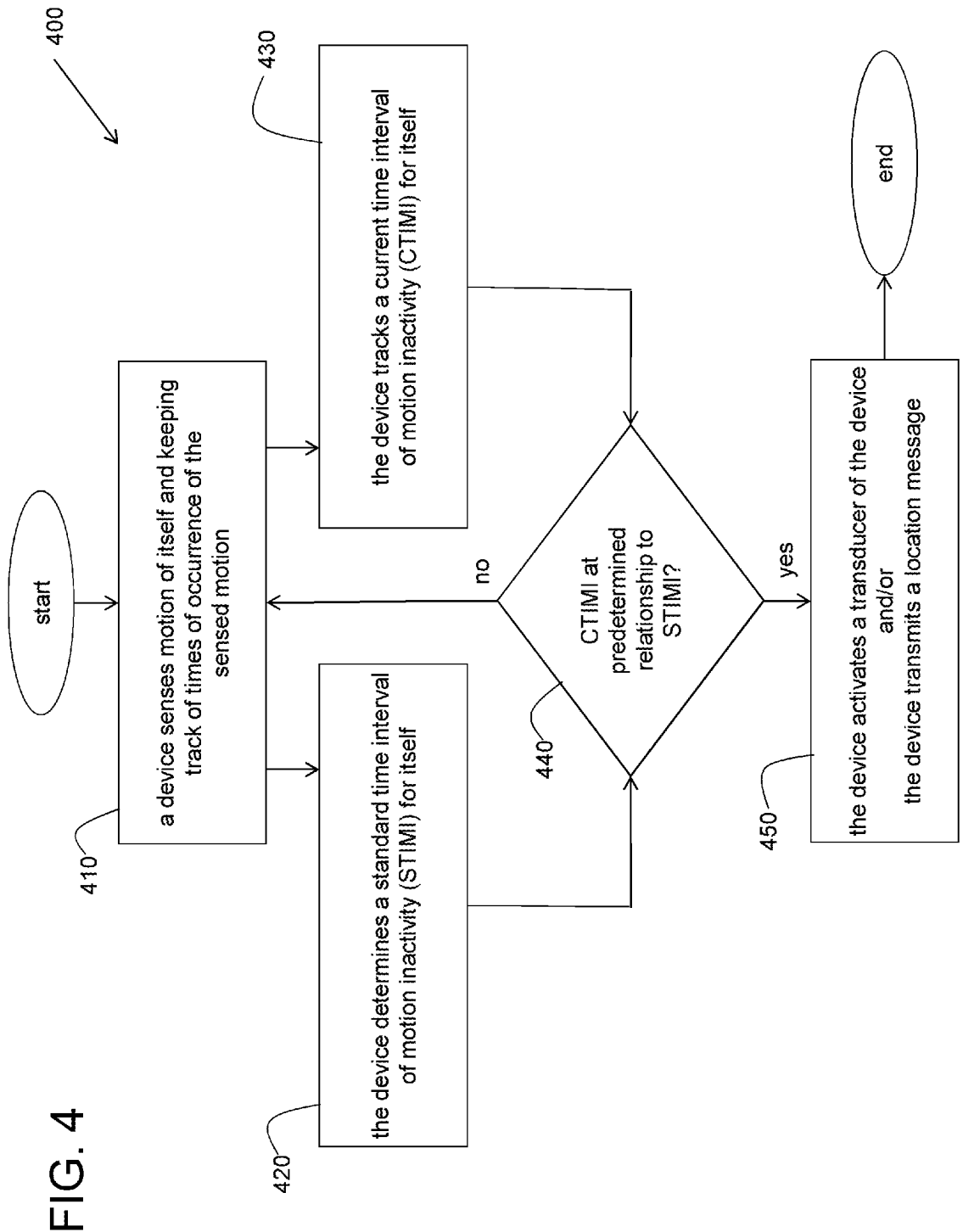
FIG. 4 is a flowchart of a first embodiment of a method of operation of the device of FIG. 1 and FIG. 2.

FIG. 4 is a flowchart of a first embodiment of a method 400 of operation of the device 100 of FIG. 1 and FIG. 2. In step 410, the device senses motion of itself and keeps track of the times of occurrence of the sensed motion. For example, if the device 100 is attached to a set of keys 310, the motion sensor 130 of the device 100 senses when a user is moving the set of keys 310 and reports the motion information to the controller 110. The clock 140 is reporting time information to the controller 110 and the controller 110 correlates the sensed motion to the time information. In accordance with an embodiment, the controller 110 may be configured to effectively ignore sensed motion that is below a defined threshold and/or sensed motion that occurs infrequently.

In step 420, the device 100 determines a standard time interval of motion inactivity (STIMI) based on the sensed motion and correlated times. For example, the STIMI may simply be an average of the various time intervals of inactivity (no significant motion) of the device 100 as calculated by the controller 110. The concept of STIMI is discussed later herein with respect to FIGS. 6A-6B and FIGS. 7A-7B.

In step 430, the device 100 is tracking a current time interval of motion inactivity (CTIMI) based on the sensed motion and the correlated times. That is, the device 100 keeps track of how long it has been since the device has sensed any significant amount of motion. Whether the amount of sensed motion is significant or not can depend on the intensity level of the sensed motion and the time duration over which the sensed motion is experienced. In this way, minor vibrations and inadvertent bumps experienced by an item may be ignored. For example, the controller 110 may determine that it has been 2 hours and 15 minutes, and counting, since the device 100 has sensed any significant amount of motion (i.e., the CTIMI is 2 hours and 15 minutes and counting).

In step 440, the CTIMI is compared to the STIMI, for example, by the controller 110. If the CTIMI is at a predetermined relationship to the STIMI (e.g., if the CTIMI exceeds the STIMI) then, in step 450, the controller 110 activates the transducer 120 and/or transmits a location message via the RF transmitter 170 in an attempt to alert the user to the location of the device 100 and, therefore, to the location of the associated item (e.g., the purse 320). In accordance with an embodiment, the user may deactivate the transducer of the device by moving the device when found. If the CTIMI is not at the predetermined relationship to the STIMI, then the device 100 continues to sense motion (if present), determine (e.g., update) the STIMI, and track the CTIMI in steps 410, 420, and 430.

If the transducer is an audible transducer, the volume of the emitted sound may slowly get louder over time after the transducer is activated, until reaching some maximum volume level. Similarly, the types of sound emitted by the audible transducer may change over time. Such changes of volume level and sound type over time may help the user find the associated item. Furthermore, in accordance with an embodiment, the controller 110 may be configured to ignore any vibrations produced by the audible transducer which are sensed by the motion sensor 130.

FIG. 5 is an illustration of an example timeline covering the course of one week and showing time intervals of motion activity and motion inactivity of an item of a user during that week based on operation of an associated device 100. The timeline shows a 24 hour period starting at 6:00 a.m. for each day of the week, Monday through Sunday, and ending at 6:00 a.m. the following day. The white intervals of time indicate time intervals of motion activity of the item, and the black intervals of time indicate time intervals of motion inactivity of the item. As can be seen from FIG. 5, the work week days, Monday through Friday, have similar time intervals of motion activity and inactivity, though not identical. Similarly, the weekend days, Saturday and Sunday, have similar time intervals of motion activity and inactivity, though not identical.

For example, on Monday through Friday, there is mostly motion activity from about 6:00 a.m. to about 6:00 p.m., and mostly motion inactivity from about 6:00 p.m. to 6:00 a.m. the following morning. This may correspond to, for example, a user's use of his eyeglasses during the day while at work, and non-use of his eyeglasses while at home or asleep. On Saturday and Sunday, the user's use of his eyeglasses tends to follow a different pattern largely because the user does not typically go to work on those weekend days.

Figure 6A:
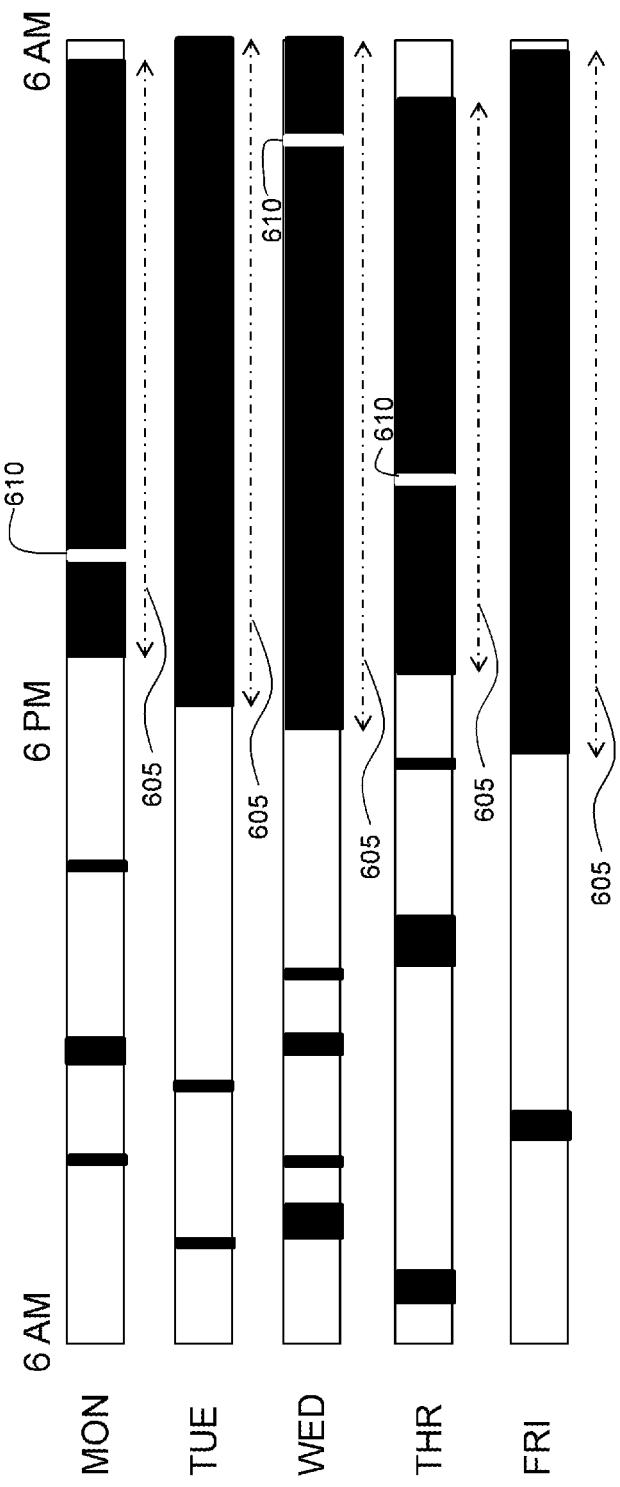
FIG. 6A is an illustration of a portion of the example timeline of FIG. 5, covering a Monday through Friday work portion of the week.

FIG. 6A is an illustration of a portion of the example timeline of FIG. 5, covering a Monday through Friday work portion of the week. In accordance with an embodiment, the controller 110 of the device largely ignores the relatively brief intervals of motion inactivity from about 6:00 a.m. to about 6:00 p.m., and focuses on the relatively long intervals of motion inactivity from about 6:00 p.m. to about 6:00 a.m. the following day. As such, the controller 110 estimates a time interval of motion inactivity 605 for each day, Monday through Friday, as indicated by the dashed/dotted arrows in FIG. 6A. Furthermore, the controller 110 may have been making such estimates for many previous workdays of previous weeks and using all of the time interval of motion inactivity information to determine the statistical nature of the information. In accordance with an embodiment, the relatively brief intervals of motion activity 610 are ignored by the controller 110 as being anomalies and, therefore, are treated as motion inactivity for the purpose of determining the time intervals of motion inactivity 605.

Figure 6B:
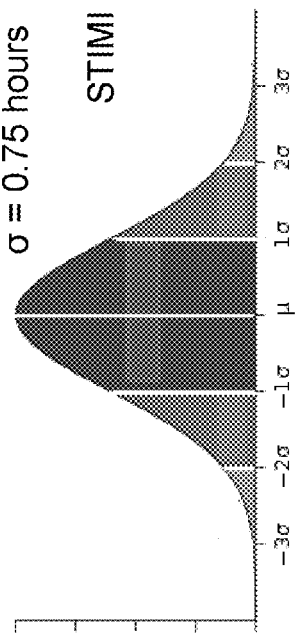
FIG. 6B is a diagram illustrating the statistical nature of the time intervals of motion inactivity of the Monday through Friday work week timelines for the item of the user (e.g., over multiple weeks, including the week shown in FIG. 6A) and an associated determination of a standard time interval of motion inactivity (STIMI)

For example, FIG. 6B is a diagram illustrating the statistical nature of the time intervals of motion inactivity of the Monday through Friday work week timelines for the item of the user (e.g., over multiple weeks, including the week shown in FIG. 6A) and an associated determination of a standard time interval of motion inactivity (STIMI). The mean, $\mu$, (e.g., 11.3 hours) and the standard deviation, $\sigma$, (e.g., 0.75 hours) of the time intervals of motion inactivity are determined by the controller 110. The controller 110 then determines the STIMI according to the formula:

$$\text{STIMI}=\mu-1.5(\sigma) \qquad (1)$$

which yields STIMI=11.3−1.5(0.75)=10.175 hours. The formula (1) may have been derived apriori from a set of training data or from some other empirical information for the item, for example, and implemented in the controller 110 (e.g., as software instructions). Other formulas, equations, or rules are possible as well, in accordance with other embodiments.

As more information is collected over time, the controller 110 adaptively updates the statistics and the STIMI such that the STIMI reflects all of the usage information of the item. In this manner, the device effectively "learns" the usage patterns of the item. In accordance with an embodiment, a weighting scheme may be implemented which, for example, weights the more recent information more heavily than the older information, causing the STIMI to be more representative of the recent usage of the item.

The controller 110 of the device 100 also tracks, in real time, the current time interval of motion inactivity (CTIMI) and compares the CTIMI to the STIMI. Again, the CTIMI is essentially how long it has been since the device 100 has sensed any significant amount of motion. In the example of FIG. 6B, the STIMI is determined to be 10.175 hours. In accordance with an embodiment, when the CTIMI exceeds 10.175 hours, the controller 110 activates the transducer 120 and/or sends a message via the RF transmitter 170 (e.g., to a mobile device of the user) to alert a user to the location of the item associated with the device. In such an embodiment, the STIMI serves as a threshold value.

In accordance with an embodiment, the device 100 may also take into account the actual day or days of the week and the actual time of day over which a CTIMI occurs. For example, the STIMI of FIG. 6B is for the days Monday through Friday and excludes Saturdays and Sundays. Furthermore, if the user were to stay home ill on a particular Wednesday, an entire 24 hour period for an item may be mostly inactive even though the controller 110 is expecting a significant amount of motion activity from 6:00 a.m. to 6:00 p.m. In such a scenario, the controller may ignore or throw out the data over that particular 24 hour period and, therefore, not factor it into the calculation of STIMI. Furthermore, certain embodiments may take into account the time of the year. For example, a device that is associated with swimming goggles may only operate to alert a user during the months of May through September (the only months that the user would use the swimming goggles), and may remain in an inactive hibernation mode for the other months of October through April. Other time-of-the-year scenarios are possible as well.

Figure 7A:
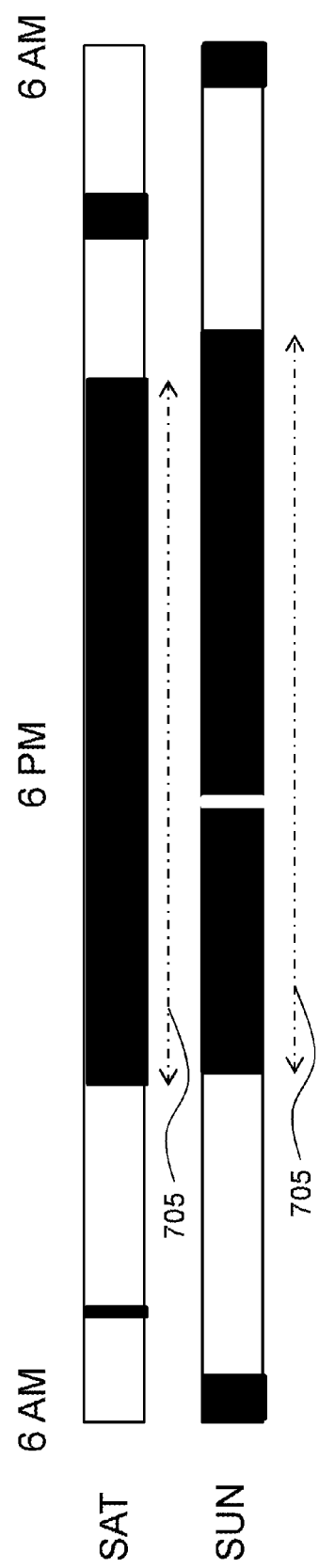
FIG. 7A is an illustration of a portion of the example timeline of FIG. 5, covering a Saturday and Sunday weekend portion of the week.

FIG. 7A is an illustration of a portion of the example timeline of FIG. 5, covering a Saturday and Sunday weekend portion of the week. In accordance with FIG. 7A, the time intervals of motion inactivity 705 are from about 12:00 noon to about 12:00 midnight. This may be due to the user having a very different schedule of activity on the weekend with respect to the work week. For example, on the weekend, the user may often socialize from about 12:00 midnight to about 6:00 a.m., and then may help his son deliver newspapers between anytime from about 6:00 a.m. to 12:00 noon. The user may tend to sleep at home between anytime from about 12:00 noon to about 12:00 midnight.

Figure 7B:
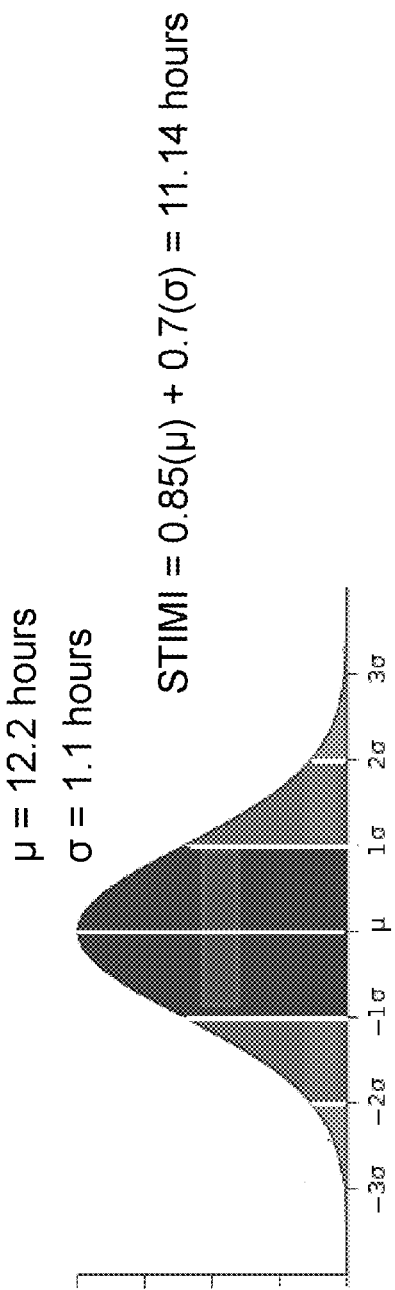
FIG. 7B is a diagram illustrating the statistical nature of the time intervals of motion inactivity of the Saturday and Sunday weekend timelines for the item of the user (e.g., over multiple weekends, including the weekend shown in FIG. 7A) and an associated determination of a standard time interval of motion inactivity (STIMI)

FIG. 7B is a diagram illustrating the statistical nature of the time intervals of motion inactivity 705 of the Saturday and Sunday weekend timelines for the item of the user (e.g., over multiple weekends, including the weekend shown in FIG. 7A) and an associated determination of a standard time interval of motion inactivity (STIMI). The mean, $\mu$, (e.g., 12.2 hours) and the standard deviation, $\sigma$, (e.g., 1.1 hours) of the time intervals of motion inactivity 705 are determined by the controller 110. The controller 110 then determines the STIMI according to the formula:

$$\text{STIMI}=0.85(\mu)+0.7(\sigma) \qquad (2)$$

which yields STIMI=0.85(12.2)+0.7(1.1)=11.14 hours. The formula (2) may have been derived apriori from a set of training data or from some other empirical information for the item, for example, and implemented in the controller 110

(e.g., as firmware instructions). Other formulas, equations, or rules are possible as well, in accordance with other embodiments.

Again, as more information is collected over time, the controller 110 adaptively updates the statistics and the STIMI such that the STIMI reflects all of the usage information of the item. In accordance with an embodiment, a weighting scheme may be implemented which, for example, weights the more recent information more heavily than the older information, causing the STIMI to be more representative of the recent usage of the item.

The controller 110 of the device 100 also tracks, in real time, the current time interval of motion inactivity (CTIMI) and compares the CTIMI to the STIMI. Again, the CTIMI is essentially how long it has been since the device 100 has sensed any significant amount of motion. In the example of FIG. 7B, the STIMI is determined to be 11.14 hours. In accordance with an embodiment, when the CTIMI comes within 1 hour of the STIMI, the controller 110 activates the transducer 120 and/or sends a message via the RF transmitter 170 (e.g., to a mobile device of the user) to alert a user to the location of the item associated with the device.

In accordance with an embodiment, the device 100 may be reset or reinitialized with respect to at least the STIMI when an intensity of a sensed motion event exceeds a determined intensity threshold value. For example, a user may reset the device 100 by violently shaking the device 100 for at least three seconds. Such resetting causes the device to effectively start over with respect to learning the usage patterns of an item associated with the device 100. However, upon reset, a default period of time (e.g., 12 hours) may be used as the STIMI, for example, until the device can accumulate enough new data to make a proper determination of STIMI based on actual usage (e.g., over several days).

FIG. 8 is a flowchart of a second embodiment of a method 800 of operation of the device 100 of FIG. 1 and FIG. 2. In step 810, the device senses motion events corresponding to movement of the device, and tracks corresponding times of occurrence of the motion events. In step 820, the device adaptively determines an alert time at which to provide an indication of a current location of the device based on one or more of the sensed motion events and corresponding times of occurrence. In step 830, the device provides the indication of a current location of the device at the alert time.

As an example of the method 800 of FIG. 8, a user has a device 100 inside his wallet 330 (e.g., in a compartment of the wallet). The user keeps his wallet in his back pocket during the day and takes it out of his pocket and places it on his night stand at night. As a result, when the user has the wallet in his back pocket, the device registers many instances of movement as the user moves about during the day, even if the movement is simply the user moving around in his chair at work. Any current time intervals of motion inactivity (CTIMI) during the day tend to be relatively short. At night, however, when the wallet is on the night stand, the device registers little or no movement. Therefore, the CTIMI's tend to be much longer at night.

Based on the large amount of activity during the day and the little, if any, amount of activity at night, the controller 110 of the device determines an alert time of 7:00 a.m. at which to provide an indication of a current location of the wallet. If the user has not moved his wallet by 7:00 a.m., the device 100 activates the audio transducer 120 and/or sends a message (e.g., a text message or an email message) to the user (e.g., to a mobile device of the user) to aid the user in finding (or remembering to take) his wallet. For example, the user may occasionally leave his wallet somewhere other than the nightstand (e.g., in the kitchen) and forget that he left it there.

In accordance with an embodiment, the alert time is adaptive and may be based on a plurality of days of sensing motion events of the wallet and determining time intervals of activity and/or inactivity (e.g., based on statistical information). In determining the alert time, the controller 110 is using not only the durations of the time intervals, but also the absolute times over which the time intervals occur. For example a particular time interval of motion inactivity may have a duration of 16 minutes and may have occurred between 9:25 a.m. and 9:41 a.m.

The device 100 may be reset or reinitialized with respect to at least alert time when an intensity of a sensed motion event exceeds a determined intensity threshold value. For example, a user may reset the device 100 by violently shaking the device 100 for several seconds. Such resetting causes the device to effectively start over with respect to learning the usage patterns of an item associated with the device 100. However, upon reset, one or more default alert times may be provided (e.g., 6:00 a.m. and 6:00 p.m.), for example, until the device can accumulate enough new data to make a proper determination of alert time based on actual usage (e.g., over several days).

Figure 9A:
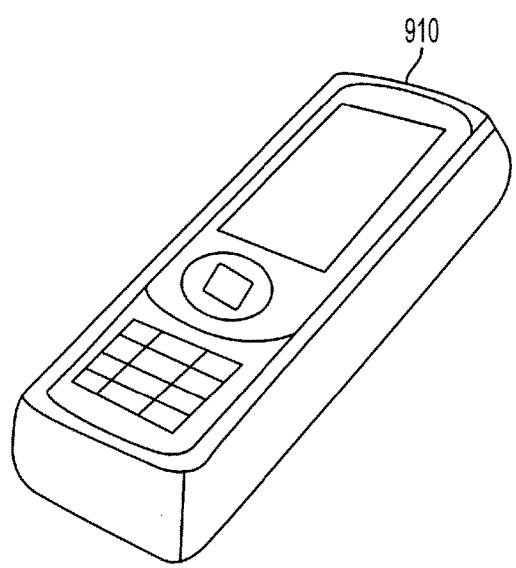
FIGS. 9A-9B are illustrations of embodiments of mobile devices (e.g., a cell phone and a tablet computer) which incorporate the functionality of the methods described herein.
Figure 9B:
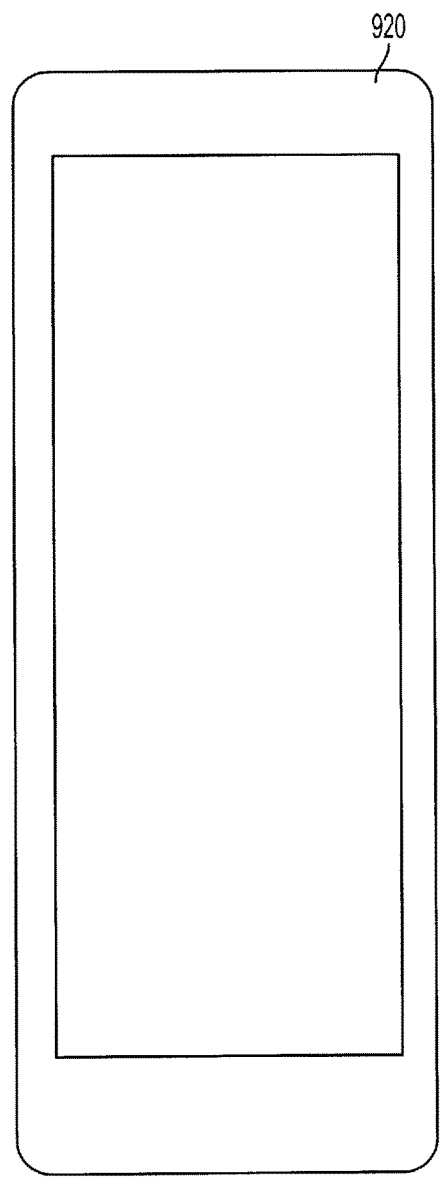

FIGS. 9A-9B are illustrations of embodiments of mobile devices (e.g., a cell phone 910 and a tablet computer 920) which incorporate the functionality of the methods described herein. For example, an embodiment of the method 400 of FIG. 4 or an embodiment of the method 800 of FIG. 8 may be implemented on the mobile device of FIG. 9A or FIG. 9B by, for example, downloading an application to the mobile device. The elements of the device 100, as shown in FIG. 1, are pre-existing, integral elements of the mobile device, in accordance with an embodiment. The controller 110 of the mobile device is configured by the downloaded application to perform the functions of the method(s).

FIG. 10 illustrates a schematic block diagram of an alternative embodiment of a device 1000 to aid in finding an associated item. The device 1000 not only includes the motion sensor 130, but also includes a thermal sensor 1010 and a photo-sensor 1020, both operatively connected to the controller 110. The thermal sensor 1010 is configured to sense heat (e.g., infrared energy) and the photo-sensor 1020 is configured to sense visible light. Therefore, in addition to sensed motion, the device 1000 may also factor in sensed levels of thermal energy and sensed levels of visible light to make determinations of use and non-use of an associated item.

For example, in accordance with an embodiment, the device 1000 may be associated with a wallet. The wallet and the associated device tends to increase in temperature when worn in a back pocket of the user due to the user's body heat. The thermal sensor 1010 can sense the increase in temperature and the controller 110 can use the resultant information from the thermal sensor as a primary indicator of use of the wallet by the user. Information from the motion sensor 130 may be used as back-up or supplemental information, or may not be used at all, in accordance with various embodiments.

As another example, in accordance with an embodiment, the device 1000 may be associated with an item that tends to be used at night by a user while sleeping, such as a sleep mask. In such an embodiment, the controller 110 may be configured to process information from the motion sensor 130 (as the user intermittently moves around during sleep) during night-time hours when it is dark outside and the lights are out, and ignore information from the motion sensor 130 during daylight hours, or when the lights are on. The information from the photo-sensor 1020 can be used by the controller 110 to discriminate between the awake daylight hours and the sleeping night-time hours of the user.

In accordance with various embodiments, a device may include all three sensors (motion, thermal, photo), only two of the sensors, or only one of the sensors. In accordance with various other embodiments, a device may include all three sensors (motion, thermal, photo) but be configured to use only one or two of the sensors based on a particular application of the device with an associated item.

In summary, devices to aid in finding items are disclosed, along with methods of operation of the devices. The resultant movement of an item during use, and lack of movement of an item during non-use, are exploited to alert a user to the whereabouts of the item through adaptive techniques. A device is associated with an item (e.g., attached to an item) and is configured to sense motion events corresponding to movement of the device and to track corresponding times of occurrence of the motion events. The device may adaptively determine a time interval of motion inactivity or an alert time at which to provide an indication of a current location of the device based on one or more of the motion events and the times of occurrence.

In the appended claims, the terms "including" and "having" are used as the plain language equivalents of the term "comprising"; the term "in which" is equivalent to "wherein." Moreover, in the following claims, the terms "first," "second," "third," "upper," "lower," "bottom," "top," etc. are used merely as labels, and are not intended to impose numerical or positional requirements on their objects. Further, the limitations of the following claims are not written in means-plus-function format and are not intended to be interpreted based on 35 U.S.C. §112, sixth paragraph, unless and until such claim limitations expressly use the phrase "means for" followed by a statement of function void of further structure. As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. Moreover, certain embodiments may be shown as having like or similar elements, however, this is merely for illustration purposes, and such embodiments need not necessarily have the same elements unless specified in the claims.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances the modified term may sometimes not be appropriate, capable, or suitable. For example, in some circumstances an event or capacity can be expected, while in other circumstances the event or capacity cannot occur—this distinction is captured by the terms "may" and "may be."

This written description uses examples to disclose the invention, including the best mode, and also to enable one of ordinary skill in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differentiate from the literal language of the claims, or if they include equivalent structural elements with insubstantial differences from the literal language of the claims.

While the claimed subject matter of the present application has been described with reference to certain embodiments, it will be understood by those skilled in the art that various changes may be made and equivalents may be substituted without departing from the scope of the claimed subject matter. In addition, many modifications may be made to adapt a particular situation or material to the teachings of the claimed subject matter without departing from its scope. Therefore, it is intended that the claimed subject matter not be limited to the particular embodiments disclosed, but that the claimed subject matter will include all embodiments falling within the scope of the appended claims.

What is claimed is:

1. A device to aid in finding an associated item, said device comprising:
    a controller;
    a transmitter operatively coupled with the controller;
    a location receiver operatively coupled with the controller and configured to identify a location of the device and provide location information to the controller;
    a motion sensor operatively coupled with the controller and configured to detect motion of the device and provide motion information to the controller; and
    a clock operatively coupled with the controller, the clock configured to provide timing information;
    wherein the controller is configured to correlate motion information and time information to adaptively learn patterns of time intervals of motion activity and compare them with a current time interval of motion activity, and to provide location information to the transmitter when the current time interval of motion activity differs from at least one learned pattern of time interval of motion activity by a predetermined amount, and wherein the transmitter is configured to transmit a message including the location information.

2. The device of claim 1, wherein the location receiver utilizes at least a mobile phone network.

3. The device of claim 1, the location receiver utilizes at least a global positioning system signal.

4. The device of claim 1, the motion sensor is an accelerometer.

5. The device of claim 1, the device is re-initialized based on the motion information.

6. The device of claim 1, further comprising an energy source, the energy source includes at least a DC battery.

7. The device of claim 1, the controller tracks intervals of motion inactivity based on the motion information.

8. The device of claim 1, the controller tracks intensity of motion activity based on the motion information.

9. A system, comprising:
    a purse;
    a location receiver located with the purse and configured to provide location information corresponding to a location of the purse;

a motion sensor located with the purse and configured to provide motion information of at least the purse;

a clock located with the purse, the clock configured to provide timing information;

a controller configured to receive the location information, motion information and timing information, and to correlate motion information and time information to adaptively learn patterns of time intervals of motion activity and compare them with a current time interval of motion activity, and to provide location information to the transmitter when the current time interval of motion activity differs from at least one learned pattern of time interval of motion activity by a predetermined amount; and a transmitter operatively coupled with the controller and configured to receive location information when forwarded by the controller and transmit a notification including the location information.

10. The system of claim 9, wherein the location receiver utilizes at least a mobile phone network.

11. The system of claim 9, the location receiver utilizes at least a global positioning system signal.

12. The system of claim 9, the motion sensor is an accelerometer.

13. The system of claim 9, the system is re-initialized based on the motion information.

14. The system of claim 9, wherein the notification is based on the motion information exceeding a defined threshold.

15. The system of claim 9, further comprising an energy source, the energy source includes at least a DC battery.

16. The system of claim 9, the controller tracks intervals of motion inactivity based on the motion information.

17. The system of claim 9, the controller tracks intensity of motion activity based on the motion information.

18. A system, comprising:

a luggage item;

a location receiver located with the luggage item and configured to provide location information corresponding to a location of the luggage item;

a motion sensor located with the luggage item and configured to provide motion information of at least the luggage item;

a clock located with the luggage item, the clock configured to provide timing information;

a controller configured to receive the location information, motion information and timing information, and to correlate motion information and time information to adaptively learn patterns of time intervals of motion activity and compare them with a current time interval of motion activity, and to provide location information to the transmitter when the current time interval of motion activity differs from at least one learned pattern of time interval of motion activity by a predetermined amount; and a transmitter operatively coupled with the controller and configured to receive location information when forwarded by the controller and transmit a notification including the location information.

19. The device of claim 1, wherein each learned pattern of time interval of motion activity comprises a combination of mean time intervals of motion inactivity and standard deviation of time intervals of motion inactivity.

20. The device of claim 1, wherein each learned pattern of time interval of motion activity comprises a standard time interval of motion inactivity (STIMI) and the current time interval of motion activity comprises a current time internal of motion inactivity (CTIMI), and the predetermined amount is when CTIMI exceeds STIMI.

21. The device of claim 1, wherein the learned patterns of time intervals of motion activity take into account a day of the week on which activity occurs.

22. The device of claim 1, wherein the learned patterns of time intervals of motion activity take into account a month of the year on which activity occurs.

23. The device of claim 1, wherein the predetermined amount of difference of the current time interval of motion activity comprises a time of day.

\* \* \* \* \*